United States Patent
Yoshikawa et al.

(10) Patent No.: US 7,019,077 B2
(45) Date of Patent: Mar. 28, 2006

(54) RESIN COMPOSITION FOR PRIMER

(75) Inventors: Satoshi Yoshikawa, Takasago (JP); Takafumi Masuda, Takasago (JP); Shoji Maekawa, Takasago (JP); Takumi Okazaki, Osaka (JP); Tsukasa Ishimoto, Osaka (JP)

(73) Assignees: Toyo Kasei Kogyo Company Limited, Osaka (JP); Arakawa Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/496,582

(22) PCT Filed: Nov. 27, 2002

(86) PCT No.: PCT/JP02/12354

§ 371 (c)(1),
(2), (4) Date: May 24, 2004

(87) PCT Pub. No.: WO03/046094

PCT Pub. Date: Jun. 5, 2003

(65) Prior Publication Data

US 2004/0266928 A1    Dec. 30, 2004

(30) Foreign Application Priority Data

Nov. 30, 2001    (JP)    ............... 2001-367092

(51) Int. Cl.
*C09D 123/28*    (2006.01)
*C09D 157/02*    (2006.01)

(52) U.S. Cl. .................. 525/76; 525/192; 525/193; 525/194

(58) Field of Classification Search .................. 525/76, 525/192, 193, 194
See application file for complete search history.

(56) References Cited

U.S. PATENT DOCUMENTS

| | | | |
|---|---|---|---|
| 4,511,687 A | 4/1985 | Nakanishi et al. | 524/270 |
| 5,863,646 A | 1/1999 | Verardi et al. | 428/323 |
| 2004/0266928 A1* | 12/2004 | Yoshikawa et al. | 524/356 |

FOREIGN PATENT DOCUMENTS

| | | |
|---|---|---|
| JP | 58-8734 A | 1/1983 |
| JP | 58-152024 A | 9/1983 |
| JP | 61-111375 A | 5/1986 |
| JP | 61-152755 A | 7/1986 |
| JP | 8-169970 A | 7/1996 |
| JP | 8-183941 A | 7/1996 |
| JP | 2000-248150 A | 9/2000 |

OTHER PUBLICATIONS

Yamaguchi et al., STN AN 2000:631984 Abstracting JP2000248150.*
Yamaguchi et al., Electronic Translation of JP 2000248150.*
Sanyo-Kokusaka Pulp Co.,STN AN 1983:424194, Abstracting JP 58008734.*

* cited by examiner

*Primary Examiner*—Jeffrey Mullis
(74) *Attorney, Agent, or Firm*—Kubovcik & Kubovcik

(57) ABSTRACT

The present invention provides a resin composition for a primer comprising (a) 100 parts by weight of a chlorinated polyolefin having a chlorine content of 5–50 wt. % and a weight-average molecular weight of 30000–120000, and (b) 15–80 parts by weight of a hydroxyl-containing petroleum resin.

5 Claims, No Drawings

RESIN COMPOSITION FOR PRIMER

TECHNICAL FIELD

The present invention relates to a resin composition for a primer that has excellent adhesion to substrates of polypropylene and like polyolefin resins and to melamine and various like coatings and has excellent low-temperature storage stability.

BACKGROUND OF THE INVENTION

Offering many advantages such as high productivity, high design flexibility, light weight, rustproofing, high impact resistance, etc., plastics are used these days in a wide variety of applications for automotive parts, electronic parts, building materials and the like. In particular, since polyolefin resins are inexpensive and have excellent moldability, chemical resistance, water resistance, impact resistance, and electrical properties, they have been widely used as industrial materials and are one of the types of material for which demand is expected to further increase in the future.

However, unlike acrylic resins and similar synthetic polar resins, polyolefin resins have drawbacks due to their crystallinity and nonpolarity, i.e., it is difficult to coat or bond them. Primers containing weakly chlorinated polyolefins that are chlorinated to 10–40 wt. % as a binder have heretofore been used to coat or bond such low-adhesion polyolefin resins.

When the cost of transportation or the amount of solvent used is considered, primers should preferably have a large solids content. However, an excessive solids content results in decreased flowability or increased viscosity at low temperatures, adversely affecting primers in practical applications, for example, impaired solubility in coatings and workability during spray coating. Moreover, the storage stability at low temperatures is also adversely affected. To control viscosity, if the molecular weight of the resins is lowered by degradation or like methods, or low-molecular-weight rosin ester resins are added, the initial adhesion and gasohol resistance are significantly impaired.

Recently, the coating technique typically employed to reduce coating lines or costs is wet-on-wet coating in which primers and coatings are applied sequentially and baked only once. However, with such coating methods, it has been impossible to obtain sufficient adhesion particularly when melamine coatings are used. This is presumably because intermediate layers are created between primers and melamine coatings due to the high polarity of melamine resins and the low polarity of conventional primers. Therefore.,resin compositions for high polarity primers are required.

DISCLOSURE OF THE INVENTION

An object of the present invention is to provide a resin composition for a primer that has excellent adhesion to polyolefin resin substrates and melamine coatings and has enhanced low-temperature storage stability and gasohol resistance.

Other objects and characteristics of the present invention will become evident by the disclosure provided hereinbelow.

The inventors conducted extensive research and found that the combination of a specific chlorinated polyolefin and a specific hydroxyl-containing petroleum resin can attain the objects described above. The inventors thereby accomplished the present invention.

In particular, the present invention provides the resin compositions for primers described below:

Item 1. A resin composition for a primer comprising (a) 100 parts by weight of a chlorinated polyolefin having a chlorine content of 5–50 wt. % and a weight-average molecular weight of 30000–120000, and (b) 15–80 parts by weight of a hydroxyl-containing petroleum resin.

Item 2. The resin composition for a primer according to Item 1 further comprising (c) an organic solvent.

Item 3. The resin composition for a primer according to Item 1 or 2, wherein the chlorinated polyolefin is an acid-modified chlorinated polyolefin produced by graft-copolymerization with 1–10 wt. % of at least one member selected from the group consisting of $\alpha,\beta$-unsaturated carboxylic acids and their acid anhydrides.

Item 4. The resin composition for a primer according to any one of Items 1–3, wherein the hydroxyl-containing petroleum resin has a hydroxyl value of 10–250 mgKOH/g.

Item 5. The resin composition for a primer according to any one of Items 1–4, wherein the hydroxyl-containing petroleum resin has a softening point of 60–200° C. and a weight-average molecular weight of 200–3000.

Item 6. The resin composition for a primer according to any one of Items 1–5, wherein the hydroxyl-containing petroleum resin is hydrogenated.

Item 7. The resin composition for a primer according to any one of Items 2–6, wherein the organic solvent is at least one member selected from the group consisting of aromatic hydrocarbons, alicyclic hydrocarbons, esters and ketones.

Chlorinated polyolefins usable herein may be produced by chlorinating polyolefins. Examples thereof include those that are further acid-modified and contain carboxyl group(s). Such chlorinated polyolefins can be readily produced according to known methods. For example, acid-modified chlorinated polyolefins can be obtained by graft-copolymerizing starting polyolefins with at least one member selected from the group consisting of $\alpha,\beta$-unsaturated carboxylic acids and their acid anhydrides, and then injecting chlorine gas in the presence of a solvent. They can also be obtained by chlorinating starting polyolefins and then graft-copolymerizing the chlorinated polyolefins with at least one member selected from the group consisting of $\alpha,\beta$-unsaturated carboxylic acids and their acid anhydrides.

Examples of starting polyolefins are propylene-based polyolefins including crystalline polypropylenes, noncrystalline polypropylenes and propylene-ethylene copolymers. Such polymers can be used alone or in combination. Among these, preferable are crystalline polypropylenes such as isotactic polypropylene and syndiotactic polypropylene, with isotactic polypropylene being particularly preferable.

Examples of $\alpha,\beta$-unsaturated carboxylic acids and their acid anhydrides to be graft-copolymerized with starting polyolefins or chlorinated polyolefins are maleic acid, maleic anhydride, itaconic acid, itaconic anhydride, fumaric acid, etc. Among these, preferable are acid anhydrides, with maleic anhydride being particularly preferable. The amount to be graft-copolymerized is preferably 1–10 wt. % and more preferably 1–6 wt. %.

To graft copolymerize, starting polyolefins or chlorinated polyolefins are dissolved in an aromatic organic solvent such as toluene, xylene or the like, or thermally fused without a solvent; and reacted with at least one member selected from the group consisting of $\alpha,\beta$-unsaturated carboxylic acids and their acid anhydrides in the presence of a radical generator.

Examples of radical generators usable in the graft copolymerization include peroxides such as di-tert-butyl peroxide, tert-butyl hydroperoxide, dicumyl peroxide, benzoyl peroxide, methyl ethyl ketone peroxide, etc.

To obtain chlorinated polyolefins by chlorination, starting polyolefins or acid-modified polyolefins are dispersed in or dissolved in a chlorinated solvent such as chloroform, carbon tetrachloride, tetrachloroethylene or the like, and reacted in the presence of a catalyst by injecting chlorine gas under ambient or increased pressure at 80–120° C.

The chlorine content of the chlorinated polyolefins (including the acid-modified chlorinated polyolefins) is 5–50 wt. %, preferably 10–40 wt. %.

The weight-average molecular weight of the chlorinated polyolefins (including the acid-modified chlorinated polyolefins) is 30000–120000, preferably 40000–80000.

Hydroxyl-containing petroleum resins usable herein refer to petroleum resins containing hydroxyl group(s) in their molecular structure due to some chemical bonding. Methods for producing such hydroxyl-containing petroleum resins are not limited. In view of industrial convenience, such petroleum resins are usually those that can be obtained by reacting polymerizable monomers contained in petroleum fractions with hydroxyl-containing compounds.

Examples of polymerizable monomers contained in petroleum fractions are isoprene, n-pentene, methylbutene, pentadiene, cyclopentene and like monomers of the C5 fraction; styrene, vinyltoluene, α-methylstyrene, indene, methyl indene and like monomers of the C9 fraction; cyclopentadiene, methylcyclopentadiene, ethylcyclopentadiene and like monomers of the cyclopentadiene portion including the dimers, trimers and codimers thereof; etc.

Hydroxyl-containing compounds refer to phenolic compounds and hydroxyl-containing olefins. Examples thereof include phenols; cresol, xylenol, p-tert-butylphenol, p-octylphenol, nonylphenol, vinylphenol and like alkyl-substituted phenols; allyl alcohol, crotyl alcohol, 1,4-butenediol, hydroxyethyl acrylate, hydroxyethyl methacrylate; 3-methyl-2-propene-1-ol, 2-methyl-2-propene-1-ol and like alkyl-substituted allyl alcohols; etc.

Methods for producing the hydroxyl-containing petroleum resins are not limited, and known methods can be employed. Examples include a method wherein a polymerizable monomer and a hydroxyl-containing compound are polymerized in the presence of a Friedel-Crafts catalyst; a method wherein a polymerizable monomer and a hydroxyl-containing compound are polymerized in the presence of a radical polymerization initiator; a method wherein a polymerizable monomer and a hydroxyl-containing compound are thermally polymerized in an autoclave; and like methods.

Specific examples of the hydroxyl-containing petroleum resins are alcohol-modified dicyclopentadiene resins, alcohol-modified C9-dicyclopentadiene resins, phenol-modified C9-dicyclopentadiene resins, phenol-modified dicyclopentadiene resins, phenol-modified C9 petroleum resins, etc.

The olefin portion of the hydroxyl-containing petroleum resins may be stabilized as necessary by hydrogenation, hydration, oxidation, hydroboration, hydrohalogenation, halogenation, etc. Among these methods, hydrogenation is preferable since it is industrially convenient and can improve the color, odor and stability of the resin. Hydrogenation can be carried out according to conventional methods.

Although the extent of hydrogenation of the aromatic portion or olefinic portion of the hydroxyl-containing hydrogenated petroleum resins is not limited, it is preferable to completely hydrogenate the olefinic portion to improve color and stability.

Alternatively, the stability and color of the hydroxyl-containing petroleum resins may be improved by adding antioxidants, UV absorbers, reducing agents, etc.

The softening point of the hydroxyl-containing petroleum resins usable herein is preferably 60–200° C. Although it depends on the application, the softening point is preferably 70° C. or greater, particularly preferably 80–130° C., since excessively low softening points result in decreased heat resistance.

The weight-average molecular weight of the hydroxyl-containing petroleum resins is preferably 200–3000, more preferably 200–2000.

The hydroxyl value of the hydroxyl-containing petroleum resins is preferably 10–250 mgKOH/g, more preferably 20–220 mgKOH/g.

In the present invention, the ratio of (b) the hydroxyl-containing petroleum resin to (a) the chlorinated polyolefin is 15–80 parts by weight, preferably 20–75 parts by weight, of hydroxyl-containing petroleum resin relative to 100 parts by weight of chlorinated polyolefin. When the hydroxyl-containing petroleum resin is used in less than 15 parts by weight, the effect of using the hydroxyl-containing petroleum resin is barely obtained. When it is used in more than 80 parts by weight, the adhesion and gasohol resistance of the resulting resin composition for a primer tend to be impaired.

The resin composition for a primer of the present invention is usually dissolved in (c) an organic solvent for use. Examples of usable organic solvents are toluene, xylene and like aromatic hydrocarbons; cyclohexane, methylcyclohexane, ethylcyclohexane and like alicyclic hydrocarbons; ethyl acetate, butyl acetate and like esters; and methyl ethyl ketone, methyl isobutyl ketone and like ketones. These solvents may be used alone or in combination. The amount of organic solvent to be used is preferably 100–10000 parts by weight, more preferably 100–1000 parts by weight, per 100 parts by weight of chlorinated polyolefin.

The resin composition for a primer of the present invention can be obtained either by mixing an organic solvent solution of (a) the chlorinated polyolefin with an organic solvent solution of (b) the hydroxyl-containing petroleum resin, or by kneading (a) the chlorinated polyolefin and (b) the hydroxyl-containing petroleum resin by an extruder to pelletize and dissolving the pellets in an organic solvent.

Stabilizers, thickeners, surfactants, etc., can be added as necessary to the resin composition for a primer of the present invention insofar as its properties are not impaired.

The resin composition for a primer of the present invention exhibits excellent adhesion to polyolefin resin substrates and various coatings such as melamine coatings and has enhanced low-temperature storage stability and gasohol resistance.

BEST MODE FOR CARRYING OUT THE INVENTION

Examples are given below to illustrate the invention in more detail, but the scope of the invention is not limited to these examples.

PRODUCTION EXAMPLE 1

Maleic Anhydride-Modified Chlorinated Polypropylene

Isotactic polypropylene (weight-average molecular weight: 50000, 275 parts by weight), 19.3 parts by weight of maleic anhydride, 5.5 parts by weight of dicumyl peroxide, and 412.5 parts by weight of toluene were introduced into an autoclave equipped with an stirrer, and, after 5 minutes of nitrogen charging, reacted while stirring for 5 hours at 140° C. After this reaction, the reaction solution was introduced into an excess of methyl ethyl ketone to precipitate a resin. This resin was further washed with methyl ethyl ketone several times to remove unreacted maleic anhydride, thereby giving maleic anhydride-modified polypropylene.

Two hundred parts by weight of this maleic anhydride-modified polypropylene and 1800 parts by weight of tetrachloroethylene were introduced into a four-neck flask and, after 5 minutes of nitrogen charging, stirred while heating to 110° C. to dissolve the resin. Two parts by weight of di-tert-butyl peroxide was added, and chlorine gas was introduced. After chlorine gas (140 parts by weight) was introduced for 3 hours, nitrogen gas was introduced to remove hydrogen chloride and unreacted chlorine gas. The solvent, i.e., tetrachloroethylene, was distilled under reduced pressure by an evaporator, and then toluene was added in replacement, thereby giving a solution of maleic anhydride-modified chlorinated polypropylene (hereinafter referred to as "Chlorinated Polyolefin A", weight-average molecular weight: 40000, chlorine content: 21 wt. %, amount of graft-copolymerized maleic anhydride: 1.7 wt. %) in toluene.

PRODUCTION EXAMPLE 2

Phenol-Modified C9 Petroleum Resin

A cracked distillate fraction with a boiling range of 140–280° C. generated during the steam-cracking of naphtha was used as 100 parts by weight of starting oil. Using 0.6 wt. % of boron trifluoride phenolate relative to the starting oil, polymerization was carried out for 3 hours at 30° C. in the presence of 3 parts by weight of phenol. Calcium hydroxide (3 parts by weight) was added to the polymerized oil thus obtained, and the mixture was stirred for 1 hour at 70° C. to neutralize, and 3 parts by weight of activated clay was further added and the mixture was stirred for 30 more minutes. The polymerized oil obtained by filtering off the calcium hydroxide and activated clay was distilled at 200° C. at 2.7 kPa for 15 minutes, thereby giving Hydroxyl-Containing Petroleum Resin A having a softening point of 105° C., a color of 9 Gardner, a hydroxyl value of 72 mgKOH/g, and a weight-average molecular weight of 1350 (polystyrene equivalent obtained by gel permeation chromatography (GPC)).

PRODUCTION EXAMPLE 3

Phenol-Modified Dicyclopentadiene Resin

Dicyclopentadiene (100 parts by weight), 100 parts by weight of phenol and 80 parts by weight of xylene were introduced into an autoclave and reacted for 4 hours at 260° C. in a nitrogen atmosphere, thereby giving a polymerized oil. This polymerized oil was distilled at 200° C. at 2.7 kPa for 15 minutes to remove unreacted monomers, oligomers and the solvent, thereby giving Hydroxyl-Containing Petroleum Resin B having a softening point of 111° C., a color of 10 Gardner, a hydroxyl value of 157 mgKOH/g, and a weight-average molecular weight of 580 (polystyrene equivalent obtained by GPC).

PRODUCTION EXAMPLE 4

Alcohol-Modified Dicyclopentadiene Resin

Dicyclopentadiene (100 parts by weight), 100 parts by weight of allyl alcohol and 80 parts by weight of xylene were introduced into an autoclave and reacted for 2 hours at 270° C. in a nitrogen atmosphere, thereby giving a polymerized oil. This polymerized oil was distilled to remove unreacted monomers, oligomers and the solvent at 200° C. at 2.7 kPa for 15 minutes, thereby giving Hydroxyl-Containing Petroleum Resin C having a softening point of 97.5° C., a color of 8 Gardner, a hydroxyl value of 210 mgKOH/g, and a weight-average molecular weight of 540 (polystyrene equivalent obtained by GPC).

PRODUCTION EXAMPLE 5

Hydrogenated Alcohol-Modified Dicyclopentadiene Resin

Hydroxyl-Containing Petroleum Resin C as obtained in Production Example 4 (100 parts by weight), 100 parts by weight of cyclohexane and 0.4 parts by weight of a stabilized nickel catalyst (manufactured by Nikki Chemical CQ., Ltd., trade name: "N-113") were introduced into an autoclave and reacted for 5 hours at 270° C. in a pressurized hydrogen atmosphere at 18 MPa. After filtering off the catalyst, the reaction mixture was distilled at 200° C. at 2.7 kPa for 15 minutes, thereby giving Hydroxyl-Containing Petroleum Resin D having a softening point of 93° C., a color of 1 Gardner or less (200 Hazen), a hydroxyl value of 143 mgKOH/g, and a weight-average molecular weight of 530 (polystyrene equivalent obtained by GPC).

PRODUCTION EXAMPLE 6

Hydrogenated Alcohol-Modified Dicyclopentadiene Resin

Hydroxyl-Containing Petroleum Resin C as obtained in Production Example 4 (100 parts by weight), 100 parts by weight of cyclohexane and 2.0 parts by weight of a stabilized nickel catalyst (manufactured by Nikki Chemical Co., Ltd., trade name: "N-113") were introduced into an autoclave and reacted for 5 hours at 240° C. in a pressurized hydrogen atmosphere at 18 MPa. After filtering off the catalyst, the reaction mixture was distilled at 220° C. at 0.27 kPa for 30 minutes, thereby giving Hydroxyl-Containing Petroleum Resin E having a softening point of 118° C., a color of 1 Gardner or less (300 Hazen), a hydroxyl value of 190 mgKOH/g, and a weight-average molecular weight of 600 (polystyrene equivalent obtained by GPC).

EXAMPLE 1

Chlorinated Polyolefin A was used as the chlorinated polyolefin and Hydroxyl-Containing Petroleum Resin A was used as the hydroxyl-containing petroleum resin. Twenty-wt. % toluene solutions were prepared for the chlorinated polyolefin and the hydroxyl-containing petroleum resin respectively. Both toluene solutions were mixed using the formulation (parts by weight) shown in Table 1 and sufficiently stirred, thereby giving a resin composition for a primer.

This resin composition for a primer was sprayed in an amount to attain a solid content of 6 g/m² onto a polypropylene substrate (manufactured by Mitsui Toatsu Chemicals, Inc.) degreased by isopropyl alcohol and left to stand for 10 minutes at room temperature to dry. A two-component urethane coating (manufactured by Kansai Paint Co., Ltd., "Retan PG80") was further spray-coated thereon in an amount of 60 g/m², and the substrate was dried for 30 minutes at 80° C. Similarly, a polypropylene substrate coated with the aforementioned resin composition for a primer was coated with a one-component melamine coating (manufactured by Kansai Paint Co., Ltd.) in the same manner as above, and the substrate was dried for 30 minutes at 120° C.

The low-temperature storage stability of the aforementioned resin composition for a primer and the properties of the coated films were evaluated according to the following methods. Table 2 shows the results.

[Low-Temperature Storage Stability]

The resin composition for a primer was left to stand at −5° C. for up to 30 days. During that period, the number of days was counted until the resin composition started to gelate.

[Initial Adhesion (Bonding)]

Four days after drying, the coated surfaces of the test pieces were provided with a grid pattern of a hundred 1-mm squares by a cutter that reached through to the underlying polypropylene substrate. An adhesive cellophane tape was securely placed on the coated surfaces, and the tape was quickly peeled horizontal to the surface. This procedure was repeated 10 times. The test pieces were graded according to how many times the tape peeling was conducted before a square created on the coated surfaces was removed, i.e., if square(s) were removed the first time the tape peeling was conducted, this test piece was given 0 points, and if square(s) were removed the second time the tape peeling was conducted, this test piece was given 1 point. If a test piece exhibited no removal after ten rounds of tape peeling, this test piece was given 10 points, with 10 being full marks.

[Gasohol Resistance]

Seven days after drying, coated test pieces whose two ends had been cut off were immersed in a gasoline mixture (conventional unleaded gasoline:ethanol=9:1). The time taken for the coating to peel to a distance of 3 mm from a cut edge of the coated test pieces was measured.

[Moisture Resistance]

Coated test pieces were immersed in 40° C. warm water for 240 hours. The condition of the coated surface was visually observed and evaluated. The evaluation scale consists of A: excellent, B: good, and C: poor.

EXAMPLES 2–5

As shown in Table 1, resin compositions for a primer were prepared in the same manner as in Example 1 except that Hydroxyl-Containing Petroleum Resin A was replaced with Hydroxyl-Containing Petroleum Resin B, C, D or E. These resin compositions were evaluated and the results are shown in Table 2.

EXAMPLE 6

As shown in Table 1, a resin composition for a primer was prepared in the same manner as in Example 4 except that the amount of the toluene solution of Hydroxyl-Containing Petroleum Resin D was altered to 25 parts by weight. This resin composition was evaluated and the results are shown in Table 2.

EXAMPLE 7

As shown in Table 1, a resin composition for a primer was prepared in the same manner as in Example 4 except that the amount of the toluene solution of Hydroxyl-Containing Petroleum Resin D was altered to 66 parts by weight. This resin composition was evaluated and the results are shown in Table 2.

COMPARATIVE EXAMPLE 1

A toluene solution of Chlorinated Polyolefin A, which does not contain a hydroxyl-containing petroleum resin, was used as a resin composition for a primer, and the properties thereof were evaluated. Table 2 shows the results.

COMPARATIVE EXAMPLE 2

As shown in Table 1, a resin composition for a primer was prepared in the same manner as in Example 1 except that Hydroxyl-Containing Petroleum Resin A was replaced with a glycerol ester of rosin (weight-average molecular weight: 920, softening point: 100° C.). This resin composition was evaluated and the results are shown in Table 2.

COMPARATIVE EXAMPLE 3

As shown in Table 1, a resin composition for a primer was prepared in the same manner as in Example 1 except that Hydroxyl-Containing Petroleum Resin A was replaced with an unmodified C9 petroleum resin that contained no hydroxyl groups (weight-average molecular weight: 1100, softening point: 100° C.). This resin composition was evaluated and the results are shown in Table 2.

TABLE 1

| Resin | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Chlorinated Polyolefin A | 100 | 100 | 100 | 100 | 100 | 100 | 100 | 100 | 100 | 100 |
| Hydroxyl-Containing Petroleum Resin A | 43 | — | — | — | — | — | — | — | — | — |
| Hydroxyl-Containing Petroleum Resin B | — | 43 | — | — | — | — | — | — | — | — |
| Hydroxyl-Containing Petroleum Resin C | — | — | 43 | — | — | — | — | — | — | — |
| Hydroxyl-Containing Petroleum Resin D | — | — | — | 43 | — | 25 | 66 | — | — | — |
| Hydroxyl-Containing Petroleum Resin E | — | — | — | — | 43 | — | — | — | — | — |
| Glycerol Ester of Rosin | — | — | — | — | — | — | — | — | 43 | — |
| Unmodified C9 Petroleum Resin | — | — | — | — | — | — | — | — | — | 43 |

TABLE 2

| | Low-Temperature Storage Stability | Adhesion (Points) | | Gasohol Resistance | | Moisture Resistance | |
|---|---|---|---|---|---|---|---|
| | | Urethane | Melamine | Urethane | Melamine | Urethane | Melamine |
| Ex. 1 | Flowable after 30 Days | 10 | 10 | No Peeling after 2-Hour Immersion | No Peeling after 2-Hour Immersion | A | A |
| Ex. 2 | Flowable after 30 Days | 10 | 10 | No Peeling after 2-Hour Immersion | No Peeling after 2-Hour Immersion | A | A |
| Ex. 3 | Flowable after 30 Days | 10 | 10 | No Peeling after 2-Hour Immersion | No Peeling after 2-Hour Immersion | A | A |
| Ex. 4 | Flowable after 30 Days | 10 | 10 | No Peeling after 2-Hour Immersion | No Peeling after 2-Hour Immersion | A | A |
| Ex. 5 | Flowable after 30 Days | 10 | 10 | No Peeling after 2-Hour Immersion | No Peeling after 2-Hour Immersion | A | A |
| Ex. 6 | Flowable after 30 Days | 10 | 10 | No Peeling after 2-Hour Immersion | No Peeling after 2-Hour Immersion | A | A |
| Ex. 7 | Flowable after 30 Days | 10 | 10 | No Peeling after 2-Hour Immersion | No Peeling after 2-Hour Immersion | A | A |
| Comp. Ex. 1 | Not Flowable after 1 Day | 10 | 10 | No Peeling after 2-Hour Immersion | Peeling after 1-Hour Immersion | A | A |
| Comp. Ex. 2 | Flowable after 30 Days | 6 | 6 | Peeling after 1-Hour Immersion | Peeling after 30-Minute Immersion | A | A |
| Comp. Ex. 3 | Flowable after 30 Days | 5 | 5 | Peeling after 1-Hour Immersion | Peeling after 30-Minute Immersion | A | A |

As is clear from Table 2, compared with the resin composition for a primer of Comparative Example 1, the resin compositions for a primer of Examples 1–7 exhibit increased low-temperature storage stability and, with respect to the melamine coating, enhanced gasohol resistance. Furthermore, compared with the resin compositions for a primer of Comparative Examples 2 and 3, the resin compositions for a primer of Examples 1–7 exhibit increased adhesion and gasohol resistance.

The invention claimed is:

1. A resin composition for a primer comprising (a) 100 parts by weight of a chlorinated polyolefin having a chlorine content of 5–50 wt. % and a weight-average molecular weight of 30000–120000, and (b) 15–80 parts by weight of
   at least one hydroxyl-containing petroleum resin selected from the group consisting of alcohol-modified dicyclopentadiene resins, alcohol-modified C9-dicyclopentadiene resins, phenol-modified C9-dicyclopentadiene resins, phenol-modified dicyclopentadiene resins and phenol-modified C9 petroleum resins,
   wherein the chlorinated polyolefin is an acidmodified chlorinated polyolefin produced by graft-copolymerization with 1–10 wt. % of at least one member selected from the group consisting of α,β-unsaturated carboxylic acids and their acid anhydrides, and the hydroxyl-containing petroleum resin has a softening point of 60–200° C. and a weightaverage molecular weight of 200–3000.

2. The resin composition for a primer according to claim 1 further comprising (c) an organic solvent.

3. The resin composition for a primer according to claim 1, wherein said at least one hydroxyl-containing petroleum resin has a hydroxyl value of 10–250 mgKOH/g.

4. The resin composition for a primer according to claim 1, wherein said at least one hydroxyl-containing petroleum resin is hydrogenated.

5. The resin composition for a primer according to claim 2, wherein the organic solvent is at least one member selected from the group consisting of aromatic hydrocarbons, alicyclic hydrocarbons, esters and ketones.

* * * * *